Patented Oct. 10, 1933

1,930,331

UNITED STATES PATENT OFFICE 1,930,331

METAL SURFACE FINISH

Ford C. Zimmer, Fort Wayne, Ind., assignor to General Electric Company, a corporation of New York No Drawing. Application April 30, 1931
Serial No. 534,131

5 Claims. (Cl. 91—68)

The present invention relates broadly to a coated article and to a process of building up a complete coating on the surface of the article by the successive application of a plurality of different coats. More specifically, it is concerned with a process whereby a metal surface to be coated is provided first with a ground coat of a vitreous enamel and then with one or more surface or top coats of an organic finishing material such as a coat having an oil, natural gum, cellulose derivative or synthetic resin base.

A principal object of the present invention is to produce an improved coated article possessing durable, protective, and decorative qualities.

For a consideration of what is believed to be novel and the invention, attention is directed to the following specification and the appended claims.

Vitreous enamels have been employed to cover or coat metallic surfaces in order to impart protective as well as decorative qualities thereto. However, where surfaces have been so treated there has been the constant liability to damage, for example, by chipping of the enamel, which results in waste and/or expensive labor coast to correct the defects so produced. Often entire articles must be scrapped where the vitreous enamel coat has been damaged.

Organic finishing materials commonly employed as coating agents to provide decorative surfaces on metallic objects have also been defective, practically speaking, in that they have had a tendency to crack and peel off from, or otherwise allow corrosion of, the metal to which they have been applied. This has in a measure been overcome by the employment of special processes using special types and kinds of organic priming coats which adhere to the metal surface and special organic finishing coats on said priming coats which adhere to the priming coat.

I have devised a method whereby I eliminate the defects of vitreous enamel coating when used per se and of organic coating materials when used alone to coat metallic surfaces. In accordance with my invention I prepare the metallic surface in any well known manner to receive a ground coat of a vitreous enamel. By the term "ground coat" is meant the first or initial coat of vitreous enamel applied to the metal by fusing the enamel thereon. This is followed by one or more coats of an organic finishing material having an oil, natural gum, cellulose derivative or synthetic resin base which may be applied by flowing, dipping or spraying. This finishing material then is dried or cured, as the case may be, either by air drying or baking. The organic finishing material may be applied to the vitreous enamel either clear or pigmented or colored depending on the finish desired.

In order to illustrate my invention but in no way limiting it the following specific descriptive example is given:

The metallic article, for example an article of steel or cast iron, to be coated is first cleaned in any suitable manner so that the surfaces thereof are ready to receive the first or ground coat of virtreous enamel. The vitreous enamel ground coat is prepared by first producing the frit from suitable materials well known in the art. The frit is ground in a ball mill with the addition of a small amount, say about 6 or 7 per cent of clay, for example a Vallender clay, and 30 to 45 per cent of water. The grinding is carried on for a length of time sufficient to produce the desired fineness and homogeneity in the enamel suspension. The enamel is now ready for application and may be applied to the properly cleaned metal surfaces by dipping, slushing or spraying after which it is dried until the water is removed. The enamel is then fused onto the metal by firing in a suitable furnace, preferably an electric furnace, at a temperature ranging for example from about 1427° F. to 1600° F.

The surface coated with the enamel is now ready to receive the top coat or coats of organic finishing material. Various well known organic finishing materials may be used. For example, a clear varnish made from a phenol-formaldehyde or alkyd type resin may be used alone or in conjunction with a pigmented enamel of the same type. If necessary the pigmented enamel may be thinned with a suitable thinner, for example acetone, to the proper consistency for dipping, brushing or spraying. The article may be air dried, baked, or both, as the case may require. Instead of a straight synthetic resin base varnish, a suitable nitrocellulose lacquer or a nitrocellulose-synthetic resin lacquer may be used. Such materials are well known in the art and readily available on the market. For example, coating compositions wherein the resin is one of the alkyd type admixed with nitrocellulose, are available to the trade as finishing materials especially for use in coating articles of various types. Similarly, coats of finishing material containing natural gums or oil bases may be used on the vitreous enamel ground coat. Such finishing materials are common in the art and readily available.

It is to be understood that the vitreous enamel ground coat may be pigmented or colored and the top coat may be clear. Or the vitreous enamel ground coat need have no particular color characteristics, the organic finishing material being suitably colored or pigmented.

Metals coated in accordance with my invention may be used for a wide variety of purposes. For example metals so coated can be used in the construction of refrigerators, electric household appliances, for example gas and electric ranges, metal kitchen furniture, etc., street lighting and industrial lighting equipment, and other places, especially where the metal appliances may be subjected to severe exposure or may be susceptible to damage by impact.

The principal advantages of the present invention over methods employing all vitreous enamel or all organic finishing materials are, first, ample protection against exposure afforded by the vitreous enamel ground coat. Second, elimination of permanent damage, due to greater flexibility of the organic finishing coat. As is known, the major difficulties encountered with vitreous enamels are chipping, hair lining, etc., and their susceptibility to becoming permanently damaged. Third, the combinations of colors to obtain the desired decorative effects are unlimited in accordance with my invention. Only limited colors can be used in vitreous enamels due to the high temperatures necessary in burning the enamel onto the surface. Fourth, economy of application of the coats in accordance with the present invention as compared to an all vitreous enamel finish. Fifth, reduction in power and equipment required for finishing as compared to an all vitreous enamel finish.

While I have described my invention with specific reference to a ground coat of vitreous enamel and one or more top or finishing coats of organic materials thereon, it is to be understood that when it is found to be necessary one or more additional coats of suitable vitreous enamel may be superposed on the ground coat prior to the application of the organic finishing coats and still fall within the scope of my invention.

What I claim as new and desire to secure by Letters Patent of the United States is:

1. A support having a corrodible metallic surface and carrying a ground coat of a vitreous enamel and a superposed protective and decorative coat of an organic finishing material entirely covering said ground coat.

2. An article of manufacture comprising a ferrous metallic surface coated with a ground coat of a vitreous enamel and superposed protective and decorative coats of organic coating compositions entirely covering said ground coat.

3. An article of manufacture having a corrodible metallic surface, said surface being provided with a protective and decorative coating consisting of a ground coat of a vitreous enamel and superposed organic finishing coats including films formed from a lacquer comprising a nitrocellulose-synthetic resin base entirely covering said ground coat.

4. A support having a corrodible metallic surface and carrying a ground coat of a vitreous enamel and a superposed protective and decorative coat of a pigmented lacquer comprising a synthetic resin base covering the entire surface of said ground coat.

5. An article of manufacture comprising a ferrous metallic surface carrying ground and intermediate coats of vitreous enamel and a plurality of protective and decorative top coats of organic coating composition, each top coat covering the entire surface of the article.

FORD C. ZIMMER.